United States Patent [19]

Izzo, Sr.

[11] Patent Number: 5,617,303

[45] Date of Patent: *Apr. 1, 1997

[54] TURN SIGNAL AND HORN ASSEMBLY FOR A BICYCLE

[76] Inventor: John J. Izzo, Sr., 56 Richmondville Ave., Westport, Conn. 06880

[ * ] Notice: The term of this patent shall not extend beyond the expiration date of Pat. No. 5,418,696.

[21] Appl. No.: 328,035

[22] Filed: Oct. 24, 1994

Related U.S. Application Data

[63] Continuation-in-part of Ser. No. 199,791, Feb. 22, 1994.
[51] Int. Cl.$^6$ .................................................. B62J 6/00
[52] U.S. Cl. ........................... 362/72; 362/418; 362/396; 362/287; 340/432
[58] Field of Search ........................ 362/72, 285, 418, 362/431, 269, 287, 249, 250, 396, 427, 430, 432; 340/432, 468, 474, 475

[56] References Cited

U.S. PATENT DOCUMENTS

| | | | |
|---|---|---|---|
| 1,660,131 | 2/1928 | Lenfers | 362/72 |
| 2,931,028 | 3/1960 | Propst | 362/72 X |
| 3,484,743 | 12/1969 | Stancil et al. | |
| 3,878,387 | 4/1975 | Kovacic | |
| 3,950,727 | 4/1976 | Smith | 362/72 |
| 4,020,458 | 4/1977 | Windisch | 340/432 |
| 4,051,361 | 9/1977 | Lichon et al. | 362/72 X |
| 4,099,159 | 9/1978 | Windisch | |
| 4,204,191 | 5/1980 | Daniels | 340/432 |
| 4,899,023 | 2/1990 | Shii-Hiwa | |
| 5,276,593 | 1/1994 | Lighthill et al. | 362/72 |
| 5,418,696 | 5/1995 | Izzo, Sr. | 362/72 |

FOREIGN PATENT DOCUMENTS

| | | | |
|---|---|---|---|
| 0635284 | 3/1983 | Italy | 340/432 |
| 6642 | of 1910 | United Kingdom | 362/72 |

OTHER PUBLICATIONS

Robert, Jean S, Direction Change Signalling Apparatus for a Cycle, May 26, 1983 whole document.

Primary Examiner—Denise L. Gromada
Assistant Examiner—Thomas M. Sember
Attorney, Agent, or Firm—David L. Baker; Rhodes & Ascolillo

[57] ABSTRACT

A signalling apparatus, for a bicycle, has a battery assembly and horn assembly housing. A horn assembly sound modulation housing is attached to the battery assembly and horn assembly in a central housing. There is a first turn signal light housing hingedly connected to the battery assembly and horn assembly housing. Another embodiment has telescoping signal light housings. There is a removable, single directional lens on the first turn signal light housing and two reflector lens on the first turn signal light housing. A second turn signal light housing is hingedly connected to the battery assembly and horn assembly housing. There is a removable, single directional lens on the second turn signal light housing and two second reflector lens on the second turn signal light housing. A first turn signal light and a second turn signal light is in their respective turn signal light housings. A turn signal light and horn activation switching circuit, in the switch assembly housing, is wired to selectively control intermittent illumination of the first turn signal light and the second turn signal light and to selectively activate the horn assembly to produce sound. A power source is in the battery assembly and horn assembly housing. A horn assembly is housed in the battery assembly and horn assembly housing. The turn signal light and horn activation switching circuit is electrically connected to the first turn signal light, to the second turn signal light, to two LED's, to the horn assembly and to the power source. The horn sounds when the turn signal lights are illuminated.

10 Claims, 7 Drawing Sheets

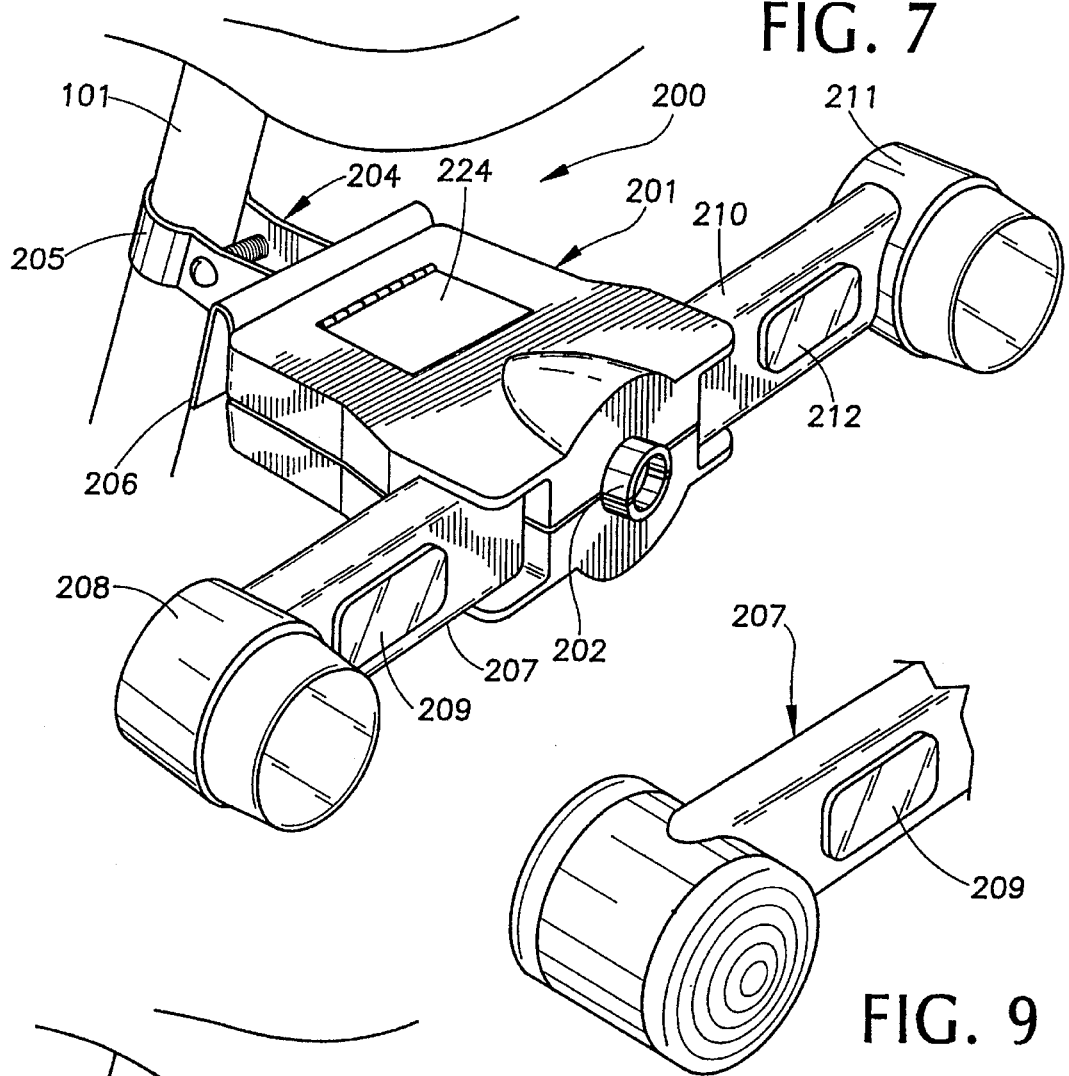
FIG. 7
FIG. 9
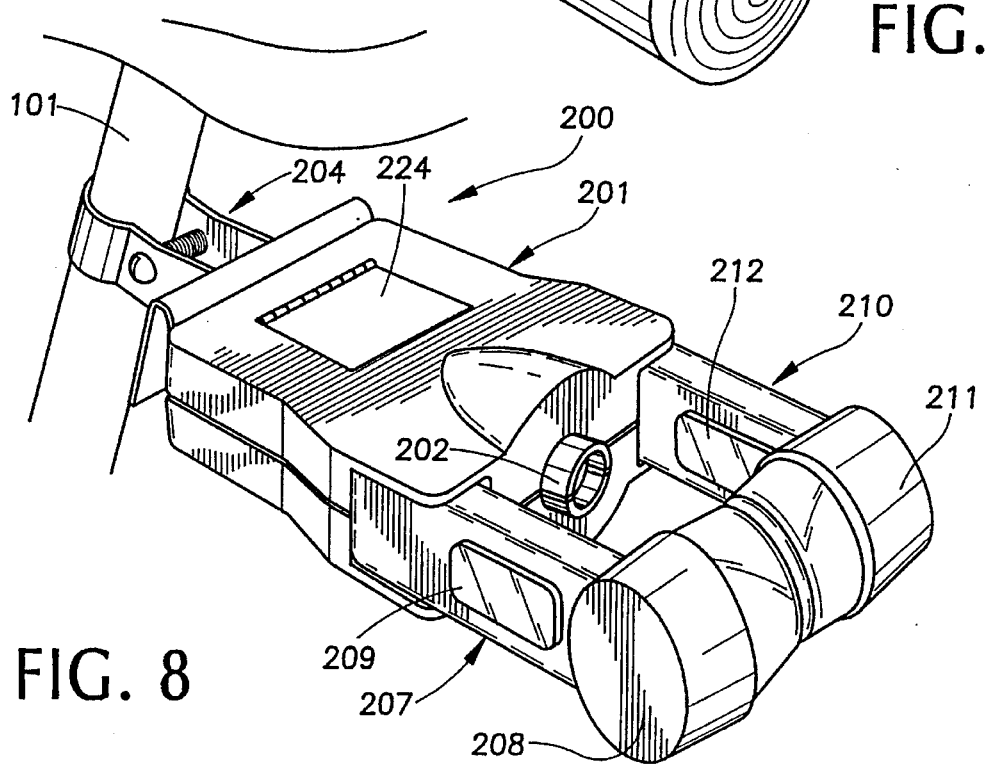
FIG. 8

TURN SIGNAL AND HORN ASSEMBLY FOR A BICYCLE

RELATED APPLICATION

The present application is a Continuation-in-Part application of pending application Ser. No. 08/199,791 filed on Feb. 22, 1994.

BACKGROUND OF THE INVENTION

1. Field of the Invention

The present invention generally relates to a bicycle mounted combination turn-signal and horn apparatus and, more particularly but not by way of limitation, to such an apparatus having telescoping arms or folding arms, on the ends of which are mounted signal lights and lens.

2. Description of the Related Art

Making motorists aware of a bicycle is difficult during the day let alone at night. Hand signals for turning or slowing down are often ignored or, since the advent of turn signals on cars, are not even understood by some drivers. Attempts to correct this have been made in the past. But cost and convenience of use and lack of ease of placement onto a bicycle by users have been a problem.

U.S. Pat. No. 3,484,743 to H. L. Stencil, et al., on Dec. 16, 1969 for Turn Signals for Motorcycles and the Like relates to a single bank of lights extending across the front and rear of a motorcycle. A selectively operable switch mechanism, having a single reversible motor, progressively energizes the lights of each bank from one side to the other, depending on whether the operator desires to give a left or right turn signal.

U.S. Pat. No. 3,878,387 to Z. Kovacic on Apr. 15, 1975 for a Bicycle Signal System discloses a stop light system for bicycle brakes embodying a battery pack and an electrical signal lamp appropriately mounted on the bicycle frame. A contact element is positioned for engagement with one of the removable brake shoe levers of the bicycle. The contact, when engaged by the brake shoe lever, completes an electrical circuit through the signal lamp, thus illuminating the same.

U.S. Pat. No. 4,099,159 to A. J. Windisch on Jul. 04, 1978 for a Light Signalling Device for Bicycles relates to a light signalling device and provides for use with bicycles and includes a housing and a cover mounted on the housing. The cover includes a plurality of light penetrable portions, with light emitting lamps mounted in the housing for separately illuminating each light penetrable portion. A multi-positionable switch is connected for controlling illumination of the light penetrable portions in various ways.

U.S. Pat. No. 4,899,023 to L. Shu-Hwa on Feb. 06, 1990 for a Bicycle Brake Light Control Switch Assembly relates to a bicycle brake light switch control assembly, suitable for mounting on most types of bicycle brakes. The device controls the turning on and off of an associated bicycle brake light in accordance with the operation of the bike brake. Upon application of a braking force, braking cables are contracted, forcing a sliding sleeve of the invention to displace further into a socket. This causes two conductive plate springs to come into contact with a conductive tube, thereby completing an electric circuit and inducing the brake light to turn on. By releasing the brake, electrical contact is ultimately broken, thus causing the brake light to turn off.

The present invention solves these problems by disclosing a Turn Signal and Horn Assembly for a Bicycle that alerts other vehicles of the rider's intentions and is easily operated and provides an easily installed assembly for either new models at manufacture or by riders as an after market assembly.

SUMMARY OF THE INVENTION

Bicycles are as popular today as they have been over the years, perhaps even more so. They are used for a variety of purposes such as transportation and for exercise, and are designed for a number of different surfaces such as asphalt or mountainous terrain. Accordingly, it may be desirable to utilize various safety signaling features on a bicycle when riding on busy streets, yet remove them in unnecessary situations such as trail riding. In this manner, a signaling system is less susceptible to damage when riding on rough terrain, if stored in a compact manner or if removed altogether.

While there are already several bicycle signaling systems in existence, none appear to incorporate the various features described herein.

Accordingly, it is a principal object of the present invention to provide a bicycle signaling device capable of signaling others of their turning intentions.

It is another object of the present invention to provide a bicycle signaling device which is more easily seen by motorists and pedestrians.

It is a further object of the present invention to provide directional indication, caution indication, stopping indication, and a horn warning to motorists and pedestrians.

It is still a further object of the present invention to provide a signaling device which is relatively compact, easily detachable, and portable.

The one aspect of the present invention achieves the above objects, among others, by providing, in one aspect, a signaling apparatus for attachment to a bicycle thereon. It includes a cylindrical housing member and a telescoping shaft member slidingly engaged within the cylindrical housing member. There is an illumination mechanism for creating a visible signal, which is disposed on a first end of the telescoping shaft member. A clamping mechanism removably attaches the cylindrical housing member to a seat mounting post on the bicycle, and a switching mechanism which is electrically connected to the illumination mechanism selectively turns it to an "ON" and an "OFF" position.

Preferably, the illumination mechanism includes a barrel shaped housing having front and back open ends, a lamp stationed within the barrel shaped housing, and front and back lens coverings positioned over the front and back open ends, respectively, whereby the lens coverings permit light produced from the lamp to pass therethrough. The front and back lens coverings preferably comprise a colored, light penetrable material.

In another aspect, the invention generally features a signaling apparatus for attachment to a bicycle thereon. It includes a cylindrical housing member, having first and second telescoping shaft members slidingly engaged within opposite ends of the cylindrical housing member. A right signal light assembly is disposed on a distal end of the first telescoping shaft member, and a left signal light assembly is disposed on a distal end of the second telescoping shaft member. There is a clamping mechanism for removably attaching the cylindrical housing member to a seat mounting post on the bicycle.

A switching mechanism for selectively controlling illumination of the right and left signal light assemblies performs the following functions: (a) illuminating only the right signal light assembly in a flashing, intermittent manner; (b) illuminating only the left signal light assembly in a flashing, intermittent manner; (c) simultaneously illuminating both the right and left signal light assemblies in a flashing, intermittent manner; and (d) simultaneously illuminating both the right and left signal light assemblies in a continuous manner.

In addition, the right and left signal light assemblies further include a barrel shaped housing having front and back open ends, a lamp stationed within the barrel shaped housing, and front and back lens coverings positioned over the front and back open ends, respectively, whereby the lens coverings permit light produced from the lamp to pass therethrough. Preferably, the front and back lens coverings further include a colored, light penetrable material.

The switching mechanism has a battery pack assembly firmly attached to a front surface of the cylindrical housing member, and a switch unit for mounting on a handle bar assembly of the bicycle. A wiring mechanism connects the switch unit to the battery pack assembly, and also to each of the right and left signal light assemblies. Additionally, the switch unit has a generally square shaped switch housing, a toggle lever protruding from a top surface of the switch housing, and a plurality of pushbuttons mounted on a front surface of the switch housing.

The toggle lever controls the functions of: (a) illuminating only the right signal light assembly in a flashing, intermittent manner; and (b) illuminating only the left signal light assembly in a flashing, intermittent manner.

A first pushbutton controls the function of: (c) simultaneously illuminating both the right and left signal light assemblies in a flashing, intermittent manner.

A second pushbutton controls the function of: (d) simultaneously illuminating both the right and left signal light assemblies in a continuous manner.

The apparatus further includes an electrically operated horn which is firmly attached to a rear surface of the cylindrical housing, with the horn being activated by a third pushbutton mounted to the front surface of the switch housing. Finally, the clamping mechanism includes a pair of opposing C-shaped clamps attached to the battery pack, with the clamps being tightened by turning a screw protruding through substantially straight portions of each of the opposing C-shaped clamps.

In an additional aspect of the present invention, a signalling apparatus for a bicycle is described that has a battery assembly and horn assembly housing. There is a horn assembly sound modulation housing attached to the battery assembly and horn assembly housing. A battery housing attachment means is removably attached to the bicycle and is removably attached to the battery assembly and horn assembly housing. There is a first turn signal light housing hingedly connected to the battery assembly and horn assembly housing. A second turn signal light housing is hingedly connected to the battery assembly and horn assembly housing. A first turn signal light is located in the first turn signal light housing. There is a second turn signal light in the second turn signal light housing. A turn signal light and horn switch assembly housing is releasably connected to the bicycle.

There is a turn signal light and horn activation switching circuit, in the turn signal light and horn switch assembly housing, for selectively controlling intermittent illumination (by a rocker switch in the switching circuit) of the first turn signal light and the second turn signal light and to selectively activate (by a pushbutton switch in the switching circuit) the horn assembly to produce sound. There is a power source and a horn assembly in the battery assembly and horn assembly housing. The turn signal light and horn activation switching circuit is electrically connected to the first turn signal light, to the second turn signal light, to a first LED to indicate when the first or left turn signal is on and to a second LED to indicate when the second or right, turn signal is on, to the horn assembly and to the power source.

The first turn signal light may have a first lens assembly that has a lens directing a light beam in a substantially semi-hemispherical direction or two first opposing lens directing a light beam in substantially opposite directions or a third lens directing a light beam in substantially one direction. The second turn signal light may have a second lens assembly that has a second lens directing a light beam in a substantially semi-hemispherical direction or two second opposing lens directing a light beam in substantially opposite directions or a third lens directing a light beam in substantially one direction.

It is, additionally, an object of this invention to provide a Turn Signal and Horn Assembly for a Bicycle that has folding turn signal light housings and a selection of lens for the housing.

BRIEF DESCRIPTION OF THE DRAWINGS

FIG. 7 is a perspective view of the turn signal and battery pack assembly showing the turn signals in the operational extended position.

FIG. 8 is a perspective view of the turn signal and battery pack assembly showing the turn signals in the stored folded position.

FIG. 9 is a partial perspective view of an alternative embodiment of the lens assembly showing a front and rear facing, double lens.

DESCRIPTION OF THE PREFERRED EMBODIMENT

Figure 1:
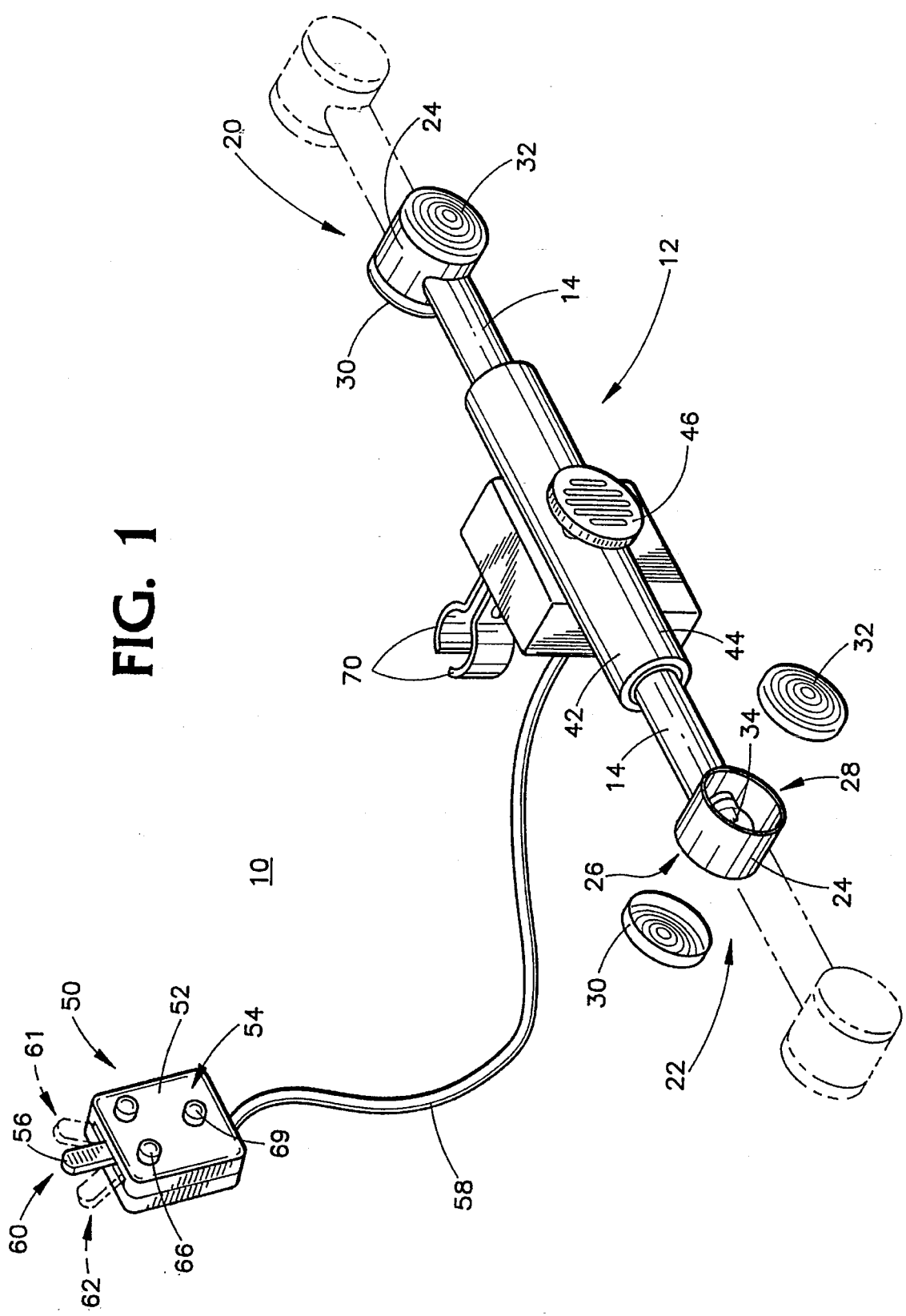
FIG. 1 is a perspective view of one aspect the bicycle signaling apparatus according to the present invention, with one of the signal light assemblies being shown in exploded perspective, and illustrating the telescoping feature of the shafts to which the light assemblies are mounted.

Referring to FIGS. 1 through 5, there is shown a bicycle signaling apparatus generally designated by the reference numeral 10. The apparatus 10 includes a cylindrical housing member 12 having a pair of generally hollow telescopic shafts 14 and 16 protruding from opposite ends therein. Located at the distal ends of each of the telescoping shafts 14 and 16 are right and left signal light assemblies 20 and 22, respectively. As both right and left signal light assemblies 20 and 22 are identical in construction, only one shall be described in further detail, for simplicity's sake.

Figure 3:
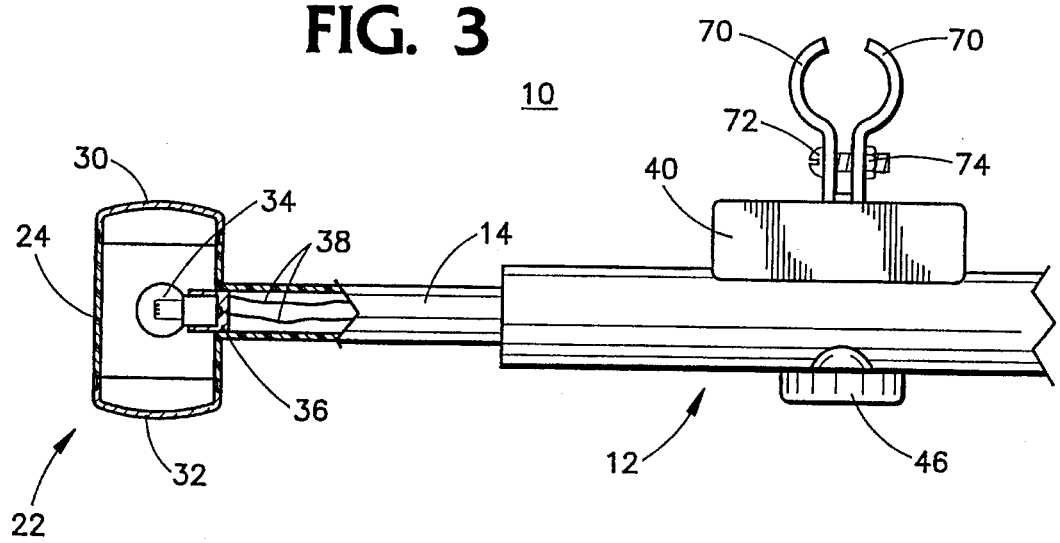
FIG. 3 is a top view of the bicycle signaling apparatus according to the present invention, partially cut away and partially in cross-section, illustrating the configuration of one of the signal light assemblies.

Right signal light assembly 20 has a generally barrel shaped outer housing 24, with the housing having open front and back ends 26 and 28. Covering the front and back open ends 26 and 28 are front and back lens coverings 30 and 32. The coverings 30 and 32 are preferably made from a colored, light penetrable material ordinarily found on standard automobile taillight assemblies. Disposed within the barrel shaped housing 24 is an ordinary lamp 34 for providing the necessary illumination used in the signaling functions of the apparatus 10. As seen in FIG. 3, the lamp 34 is mounted in a socket 36, located at the junction between the telescoping shaft 14 and the barrel shaped housing 24. Associated wiring 38 runs from the socket 36 and the telescopic shaft 14 to make the appropriate electrical connections, discussed in greater detail hereinafter.

Referring again to FIG. 1, a battery pack housing 40 is attached to the front surface 42 of the cylindrical housing member 12. The battery pack housing 40 is suitable for containing a battery 43 (shown schematically in FIG. 3) and any other components necessary to facilitate the desired electrical operations of the present invention. Disposed on the rear surface 44 of the cylindrical housing member 12 is an electrically operated horn 46, a type of which is well known in the art.

A switch unit 50 is provided for selectively controlling various illuminating functions of the apparatus 10. The switch unit 50 includes a generally square shaped switch housing 52 having a plurality of pushbutton switches on its face, as at 54. There is also a toggle lever switch 56 protruding from the top of the switch housing 54. Finally, a cord 58 is provided to electrically connect the switch unit 50 to the battery pack housing 40.

Figure 4:
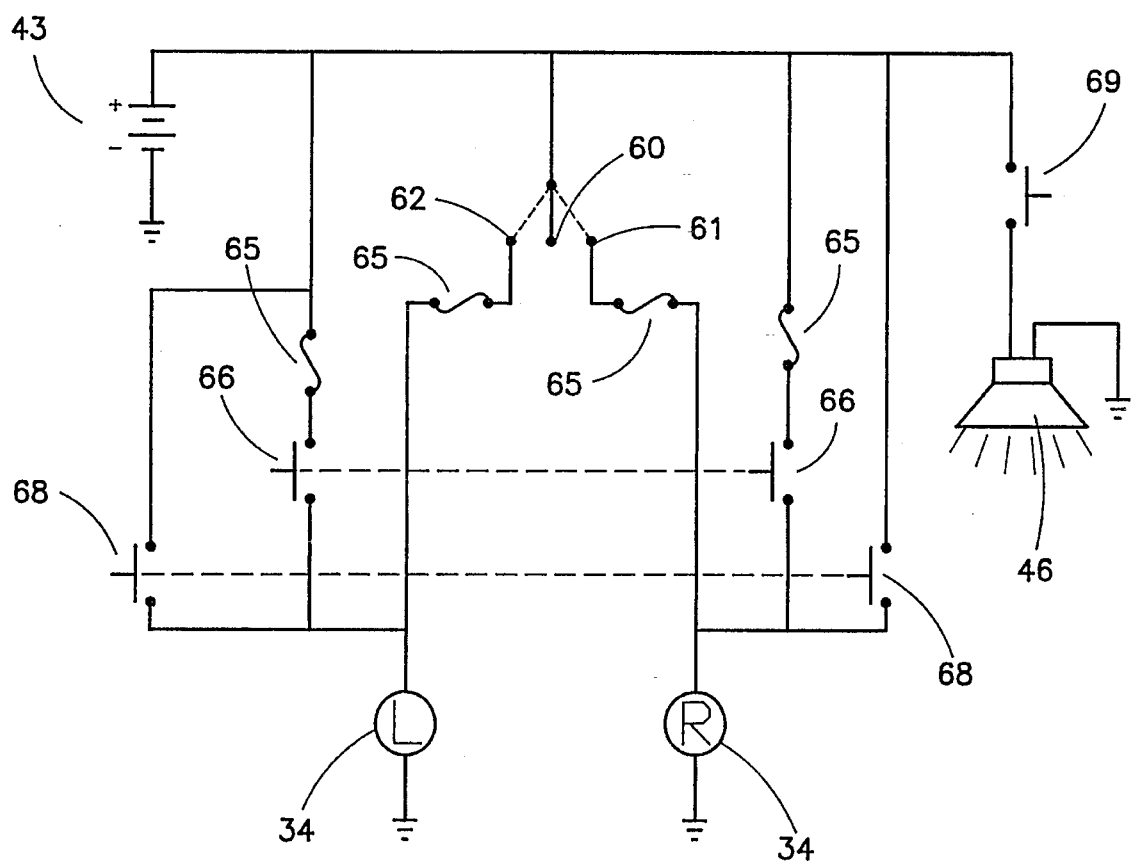
FIG. 4 is a wiring schematic of the bicycle signaling apparatus according to the present invention.

As disclosed, the apparatus 10, in its present embodiment, is designed to perform the following functions, which are best understood by referring to FIGS. 1 and 4:

First, the operator may illuminate only the right signal light assembly 20 in a flashing, intermittent manner, signaling the operator's desire to make a right turn. This is accomplished by flipping the toggle lever switch 56 from the neutral position 60 to the right turn position 61. A circuit is completed from the positive terminal of the battery 43, through a flashing element 65, and to the right signal lamp 34. The flashing element 65 may consist of a bimetallic strip or any other group of solid state components which causes the lamp 34 to flash in an intermittent manner. These devices are common and well known in the art.

Second, the operator may illuminate only the left signal light assembly 22 in a flashing, intermittent manner, signaling the operator's desire to make a left turn. This function is accomplished in manner similar to the fight turn function. This time, the toggle lever switch 56 is flipped to the left turn position 62, and a circuit is completed from the positive terminal of the battery 43, through another flashing element 65, and to the left signal lamp 34.

Third, the operator may simultaneously illuminate both the right and left signal light assemblies in a flashing, intermittent manner, signaling the operator's desire to display a caution signal. This function is accomplished by depressing a first pushbutton switch 66 on the switch housing 52, causing a completed circuit through additional flashing elements 65 to both right and left signal lamps 34.

Fourth, the operator may simultaneously illuminate both the right and left signal light assemblies in a continuous manner, signaling the operators desire to display a stop signal. This function is accomplished by depressing a second pushbutton switch 68 on the switch housing 52, causing a completed circuit through both right and left signal lamps 34.

Finally, as seen from FIG. 3, the operator can sound the horn 46 by simply depressing a third pushbutton switch 69 on the switch housing 52.

Figure 2:
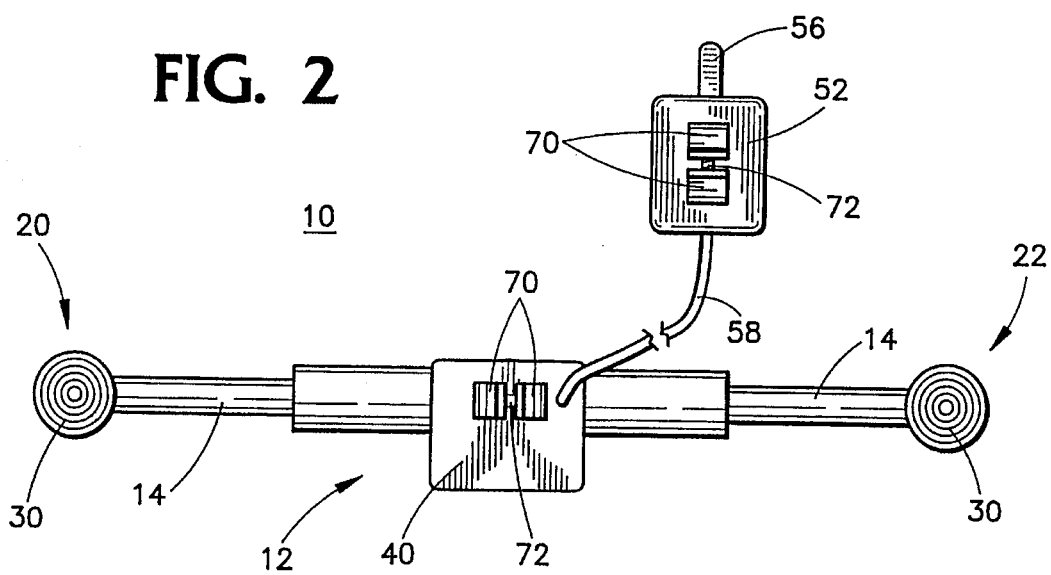
FIG. 2 is a rear view of the bicycle signaling apparatus according to the present invention, illustrating the orientation of the clamping members.
Figure 5:
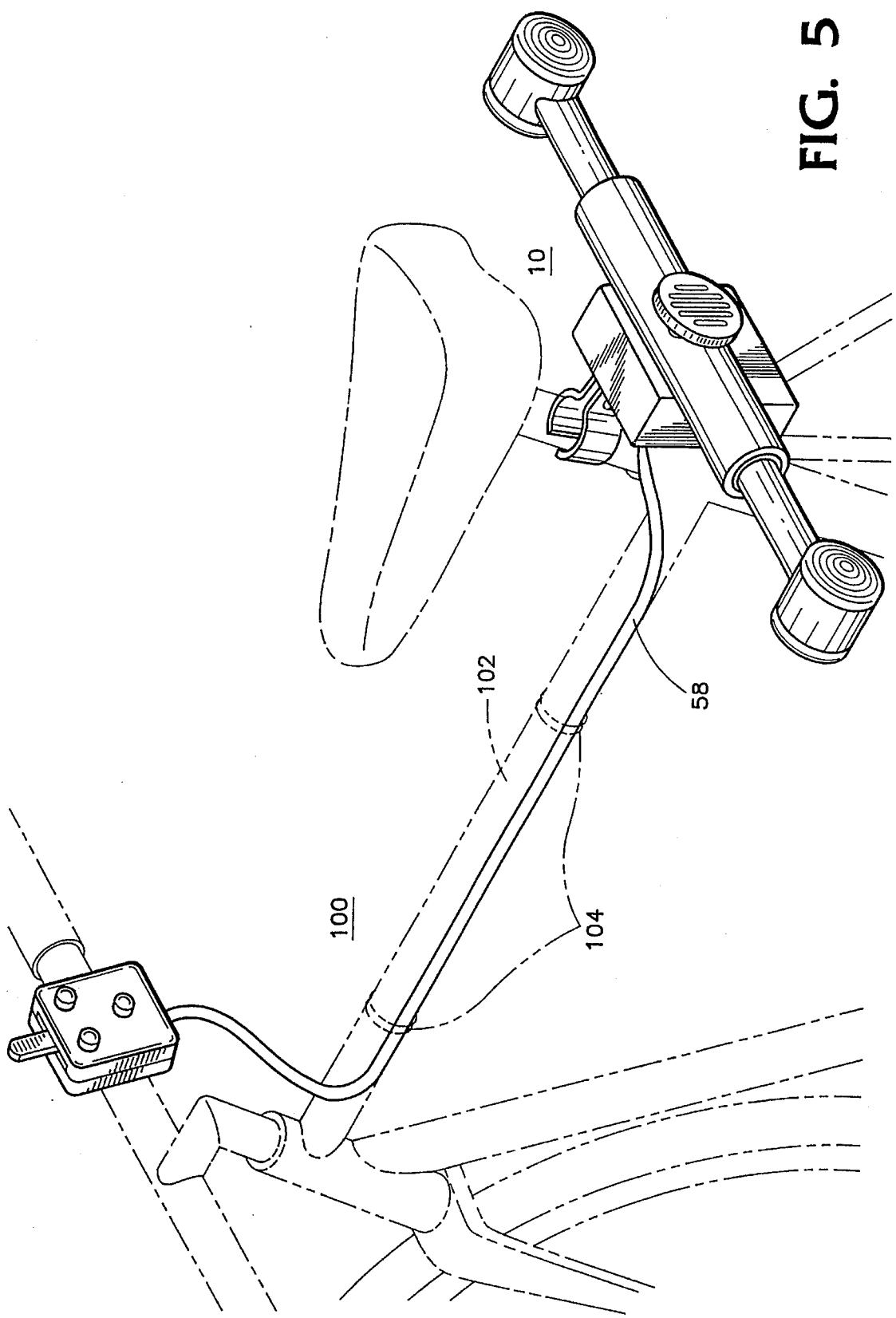
FIG. 5 is a perspective view of the bicycle signaling apparatus according to the present invention, illustrating its installment on a bicycle, shown in phantom.
Figure 6:
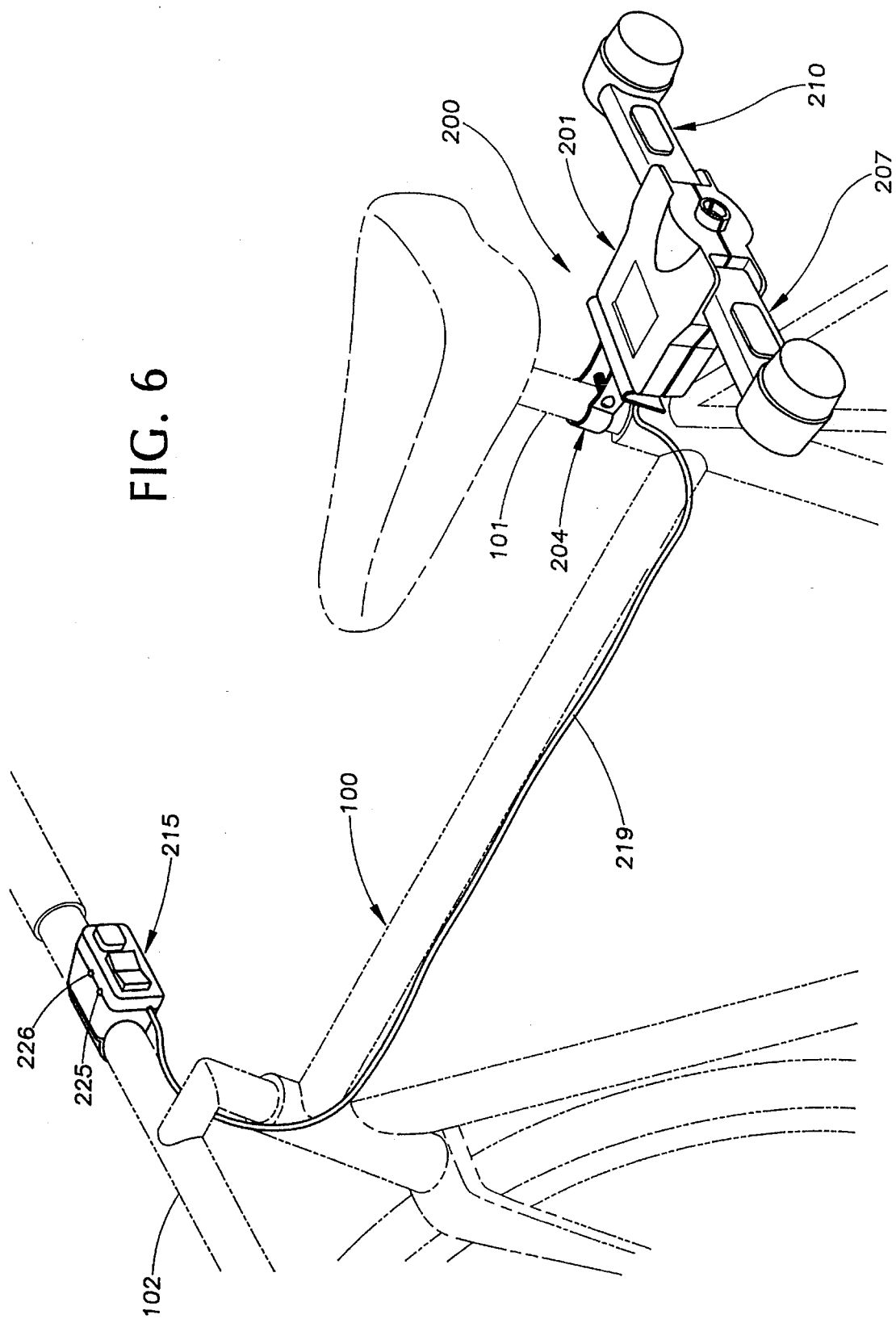
FIG. 6 is a perspective view of the preferred embodiment of the Turn Signal and Horn Assembly for a Bicycle mounted onto a bicycle shown in a partial phantom perspective view.
Figure 10:
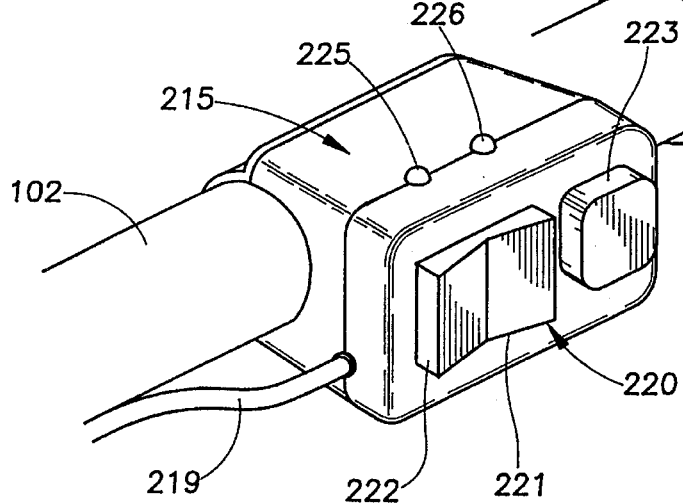
FIG. 10 is a schematic of the turn signal and horn circuit.
Figure 11:
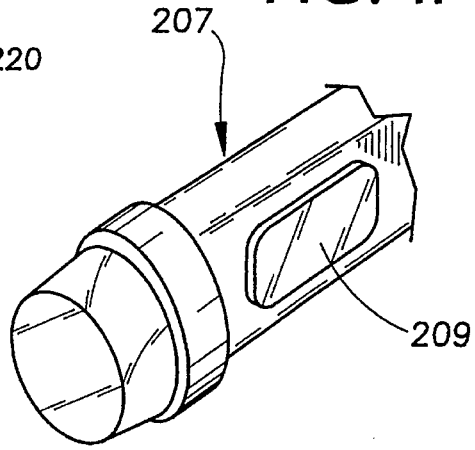
FIG. 11 is partial perspective view of another alternative embodiment of the lens assembly showing a lens that directs light in a substantially semihemispherical direction.
Figure 12:
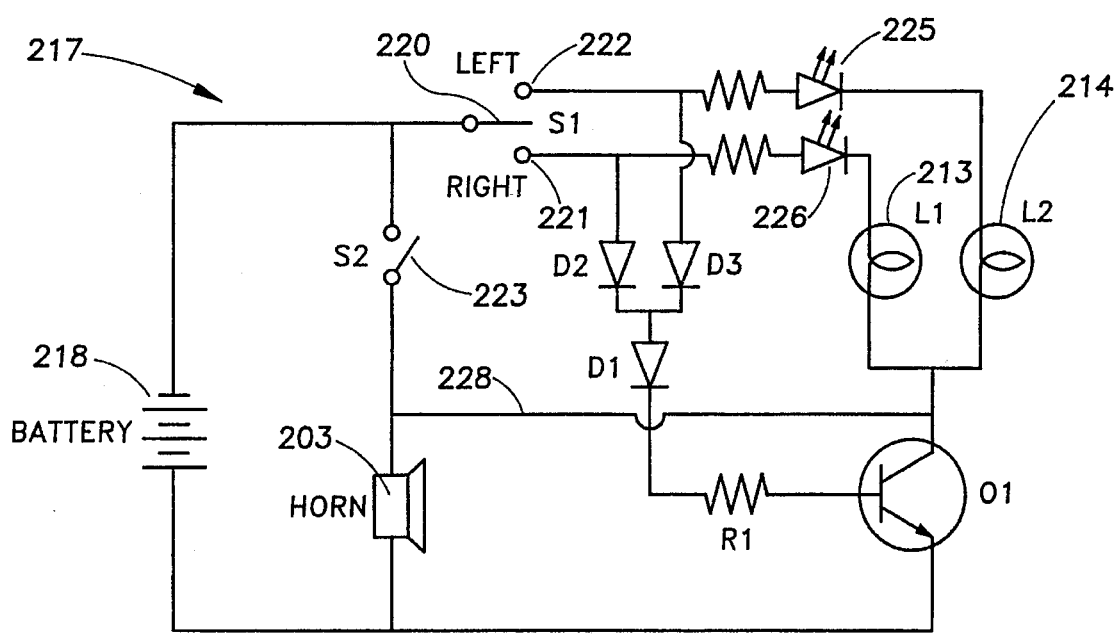
FIG. 12 is partial perspective view of a third and preferred embodiment of the lens showing a single rearward facing lens assembly.

Attachment of the apparatus 10 to a typical bicycle is accomplished through the use of a pair of opposing C-shaped clamps 70. A pair of clamps 70 is shown attached to the back of the battery pack housing 40 in FIG. 3, and having a screw 72 protruding through substantially straight portions of the clamps 70, with a fastening nut 74 on one end of the screw for adjustably tightening the clamps. As seen in FIG. 2, the switch unit 50 also has a pair of the above described clamps 70 for attachment to the handlebars of a bicycle thereon. FIG. 5 shows the apparatus as installed on a bicycle 100. The cord 58, as shown in FIG. 5, can be secured to the crossbar 102 of the bicycle 100 with the use of ties 104, which may be of any type known in the art.

Referring to FIGS. 6 through 12, the preferred embodiment of a signalling apparatus 200, for a bicycle 100, is shown and described that has a battery assembly and horn assembly also described as the central housing 201. A horn assembly sound modulation housing 202 (to better direct the sound of the horn assembly 203 and to reduce the chance of water contacting the horn assembly 202) is attached to the battery assembly and horn assembly housing 201. A battery housing attachment means also described as a clamp attachment means 204 (a double gripping clamp) is removably attached at one end 205 to the bicycle 100 (usually the seat post 101) and removably attached at another end 206 to the battery assembly and horn assembly housing 201. This clamp is fitted over the object to be clamped and a screw and nut used to secure the clamps. There is a first turn signal light housing 207 hingedly connected to the battery assembly and horn assembly housing 20 1.

There is a first, removable lens 208 (directing light in substantially one direction) on a distal end of the first turn signal light housing 207 and at least one (preferably two) first reflector lens 209 on the first turn signal light housing 207. A second turn signal light housing 210 is hingedly connected to the battery assembly and horn assembly housing 201. There is a second, removable lens 211 (directing light in substantially one direction) on a distal end of the second turn signal light housing 210 and at least one (preferably two) second reflector lens 212 on the second turn signal light housing 210.

A first turn signal light 2 13 is located in the first turn signal light housing 207 and a second turn signal light 2 14 is in the second turn signal light housing 210. A turn signal light and horn switch assembly housing 215 is releasably connected (usually by an adjustable or spring-tension clamp 216) to the bicycle handle bars 102. All housing assemblies can be made of metal and formed by known sheetmetal forming methods or made of plastic and formed by known plastic molding methods. Lens may be made of molded plastic or glass.

There is a turn signal light and horn activation switching circuit 217, in the turn signal light and horn switch assembly housing and partially in the battery assembly and horn assembly housing 201 and first and second turn signal light housings, for selectively controlling intermittent illumination (by rocker switch 229 in the switch circuit 217) of the first turn signal light 213 and the second turn signal light 214 and to selectively activate the horn assembly 203 (by pushbutton switch 223 in the switch circuit 217) to produce sound. There is a power source 218 (at least one battery but usually a plurality of batteries) in the battery assembly and horn assembly housing 201. A horn assembly 203 is housed in the battery assembly and horn assembly housing. The turn signal light and horn activation switching circuit 217 is electrically connected by wiring such as a wire or wires 219 to the first turn signal light 213, to the second turn signal light 214, to the horn assembly 203 and to the power source 2 18. The horn assembly could be a piezo electric type horn assembly.

In operation, the hinged turn signal housings 207 and 210 may be folded in for storage or for shipping (see FIG. 8) and then extended (see FIGS. 6 and 7) when the bicycle 100 is being ridden. The rocker switch or turn signal activation switch 220 (shown in FIGS. 6 and 9) may be engaged on the right side 22 1 for signalling a right turn and on the left side 222 for signalling a left turn. The LED's 225 and 226 illuminate upon each illumination of the left turn signal light 213 and the right turn signal light 214, respectively. The horn push button or horn activation switch 223 may be pressed for as long as the user wants to sound the horn and then released. There is a turn signal sub-circuit 228 in the turn signal light and horn activation switching circuit 2 17 that intermittently activates the horn assembly 203 when either the first turn signal light 213 or the second turn signal light 214 are illuminated. This gives an aural indication of the turn signals are being used.

To change the batteries 218, the battery access plate 224, on the battery assembly and horn assembly housing 201, is hingedly opened and the batteries removed and replaced. The lens 208 and 211 may be removed to allow the user to replace burned-out bulbs.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. A signalling apparatus, for a bicycle, comprising:
   (a) a central housing comprising:
       a battery assembly; and
       a horn assembly attached to the battery assembly;
   (b) a horn assembly sound modulation housing attached to the central housing;
   (c) a clamp attachment means removably attached to the central housing and removably attached to a seat post of the bicycle;
   (d) a first turn signal light housing hingedly connected to the central housing;
   (e) a second turn signal light housing hingedly connected to the central housing;
   (f) a first turn signal light in the first turn signal light housing;
   (g) a second turn signal light in the second turn signal light housing;
   (h) a turn signal light and horn switch assembly housing releasably connected to the bicycle;
   (i) a turn signal light and horn activation switching circuit, in the turn signal light and horn switch assembly housing, for selectively controlling intermittent illumination of the first turn signal light and the second turn signal light and to selectively activate the horn assembly to produce sound;
   (j) a power source in the battery assembly; and
   (k) the turn signal light and horn activation switching circuit being electrically connected to the first turn signal light, to the second turn signal light, to the horn assembly and to the power source.

2. A signalling apparatus as described in claim 1 wherein the first turn signal light housing further comprises a first lens assembly.

3. A signalling apparatus as described in claim 1 wherein the second turn signal light housing further comprises a second lens assembly.

4. A signalling apparatus as described in claim 2, wherein the first lens assembly further comprises a first lens directing a light beam in a substantially semi-hemispherical direction.

5. A signalling apparatus as described in claim 3, wherein the second lens assembly further comprises a second lens directing a light beam in a substantially semi-hemispherical direction.

6. A signalling apparatus as described in claim 2, wherein the first lens assembly further comprises two first opposing lens directing a light beam in substantially opposite directions.

7. A signalling apparatus as described in claim 3, wherein the second lens assembly further comprises two second opposing lens directing a light beam in substantially opposite directions.

8. A signalling apparatus, for a bicycle, comprising:
   (a) a central housing comprising:
       a battery assembly; and
       a horn assembly attached to the battery assembly;
   (b) a horn assembly sound modulation housing attached to the central housing;
   (c) a clamp attachment means removably attached to the central housing and removably attached to a seat post of the bicycle;
   (d) a first turn signal light housing hingedly connected to the central housing;
   (e) at least one first reflector lens on the first turn signal light housing;
   (f) a second turn signal light housing hingedly connected to the central housing;
   (g) a first lens assembly on the first turn signal light housing;
   (h) a second lens assembly on the second turn signal light housing;
   (i) at least one second reflector lens on the second turn signal light housing;
   (j) a first turn signal light in the first turn signal light housing;
   (k) a second turn signal light in the second turn signal light housing;
   (l) a turn signal light and horn switch assembly housing releasably connected to the bicycle;
   (m) a turn signal light and horn activation switching circuit, in the turn signal light and horn switch assembly housing, for selectively controlling intermittent illumination of the first turn signal light and the second turn signal light and to selectively activate the horn assembly to produce sound;

(n) a power source in the battery assembly;

(o) the power source further comprising at least one battery;

(p) the turn signal light and horn activation switching circuit being electrically connected to the first turn signal light, to the second turn signal light, to the horn assembly and to the power source; and (q) the turn signal light and horn activation switching circuit comprising:

a turn signal activation switch in turn signal light and horn activation switching circuit;

a horn activation switch;

at least two LED's in the turn signal light and horn activation switching circuit to visually indicate when the first turn signal light and the second turn signal light are activated, respectively; and a turn signal sub-circuit intermittently activating the horn assembly when the first turn signal light and the second turn signal light are illuminated.

9. A signalling apparatus as described in claim 8 wherein the first lens assembly further comprises a first lens directing a light beam in substantially one direction.

10. A signalling apparatus as described in claim 8 wherein the second lens assembly further comprises a second lens directing a light beam in substantially one direction.

* * * * *